Figure 1:
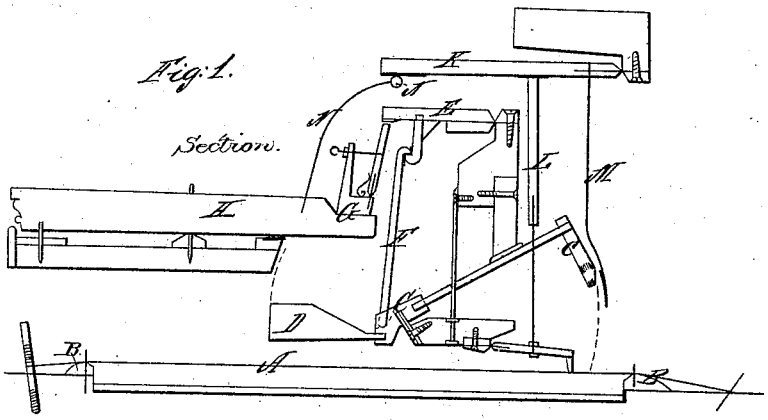
Figure 1:
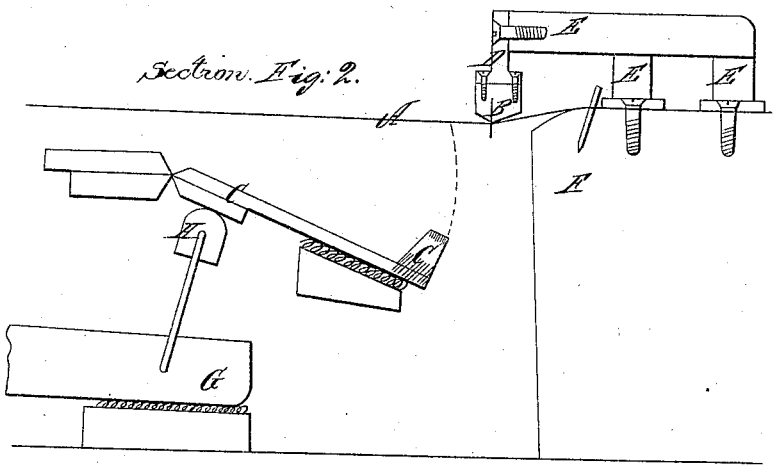

4754X

T. Loud Jr,

Piano Action,

Patented May 15, 1827.

Section.

Section. Fig: 2.

AM. PHOTO-LITHO. CO. N.Y. (OSBORNE'S PROCESS.)

Missing
Page